United States Patent [19]

Nanba et al.

[11] 4,174,160
[45] Nov. 13, 1979

[54] PROGRAMMED AUTOMATIC EXPOSURE CONTROL CIRCUITRY

[75] Inventors: Yasuhiro Nanba, Osaka; Seiji Yamada, Sakai, both of Japan

[73] Assignee: Minolta Camera Kabushiki Kaisha, Osaka, Japana

[21] Appl. No.: 828,666

[22] Filed: Aug. 29, 1977

[30] Foreign Application Priority Data

Sep. 7, 1976 [JP] Japan ................................ 51/107609

[51] Int. Cl.² ......................... G03B 7/08; G03B 17/18
[52] U.S. Cl. ....................................... 354/24; 354/37; 354/38; 354/60 E
[58] Field of Search ....................... 354/24, 29, 30, 31, 354/38, 43, 44, 50, 51, 53, 57, 60 E, 60 R; 356/223; 352/141

[56] References Cited

U.S. PATENT DOCUMENTS 3,950,765  4/1976  Nanba et al. ........................... 354/29
3,964,073  6/1976  Kobori et al. ........................... 354/29

Primary Examiner—L. T. Hix
Assistant Examiner—William B. Perkey
Attorney, Agent, or Firm—Watson, Cole, Grindle & Watson

[57] ABSTRACT

In a photographic camera capable of programmed automatic exposure control, circuitry is provided for also enabling exposure time-preferred automatic diaphragm control and diaphragm-preferred automatic exposure time control. The diaphragm is settable to an initial aperture size, which may be the fully opened aperture, and is capable of being changed to different aperture sizes. A first signal is generated in accordance with the logarithm of the light intensity measured through the diaphragm. A second signal is generated in accordance with a manual exposure time setting circuit. A third signal intermediate the first and second signals is generated with a predetermined ratio between the difference of the first and third signals with respect to the difference between the third and second signals. The diaphragm is set by determining the difference from the initial aperture size to the aperture size to be set in accordance with either the difference between the first and third signals or the difference between the third and second signals with the diaphragm at its initial aperture size. The exposure time is controlled commensurate with the diaphragm aperture set by the diaphragm aperture setting mechanism. An indicator indicates the F-number or exposure time, respectively, in accordance with the mode of operation.

21 Claims, 8 Drawing Figures

PROGRAMMED AUTOMATIC EXPOSURE CONTROL CIRCUITRY

BACKGROUND OF THE INVENTION

1. FIELD OF THE INVENTION

The present invention relates to a photographic camera with automatic exposure control and more particularly to a photographic camera capable of programmed automatic exposure control.

2. PRIOR ART

In this field, U.S. Pat. No. 3,950,765 and U.S. Pat. No. 3,964,073 disclose photographic cameras capable of programmed automatic exposure control. However, the technology according to the aforementioned patents is relatively complex, especially with respect to the manner of obtaining a signal required for the programmed automatic exposure control.

SUMMARY OF THE INVENTION

It is an object of the present invention to provide an improved camera capable of programmed automatic exposure control.

It is another object of the present invention to provide a camera which achieves programmed automatic exposure control in a simplified manner.

It is a further object of the present invention to provide a camera in which the signal required for programmed automatic exposure control is obtained in an improved manner.

It is a still further object of the present invention to provide a camera capable of programmed automatic exposure control with a circuit suitable for selectable diversion to exposure-time-preferred automatic diaphragm control or to diaphragm-preferred automatic exposure time control and is further suitable for indication of exposure information.

DETAILED DESCRIPTION OF THE PREFERRED EMBODIMENTS

Figure 1:
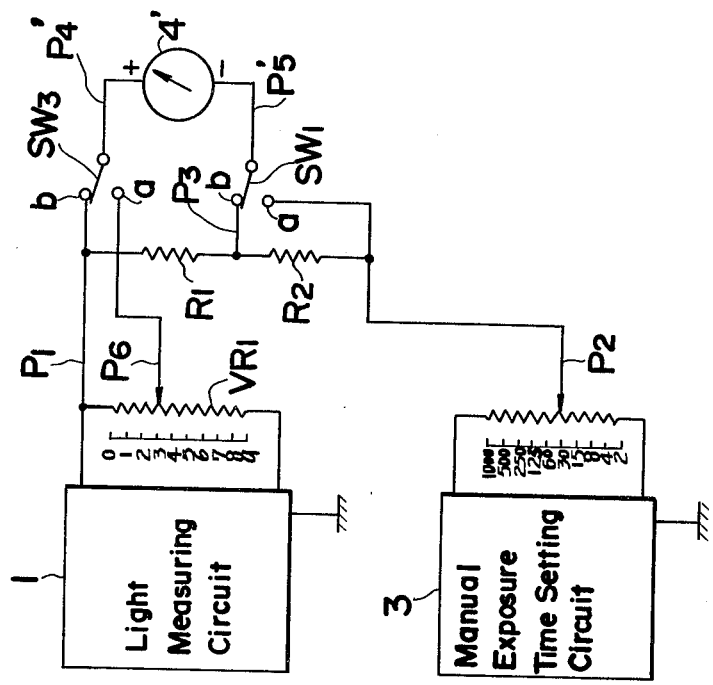
FIG. 1 is a combined block and schematic diagram illustrating an embodiment of the present invention.

FIG. 1 shows objective lens L, diaphragm F, and TTL light measuring element PD in operative relationship. Light measuring circuit 1 effects photographic computation of both film speed information supplied from film speed setting circuit 2, and the result of TTL light measurement, thereby providing on line P1 a voltage signal proportional to an exposure time value Tv, represented according to the APEX system of notation. Manual exposure time setting circuit 3 provides on line P2 a voltage signal proportional to a Tv value at a given set shutter speed. In this respect, the difference between the voltages on both output lines P1 and P2 is divided by resistors R1 and R2, so that an intermediate value between both voltage signals, which value determined by the ratio of R1 to R2, is derived at node P3. The ratio of R1 to R2 is suitably selected as will be apparent from the following description. In the case where R1=R2, then the voltage at point P3 is just a mean or midway value between the voltages on lines P1 and P2. The ratio of R1 to R2 may be set by adjusting the resistance of variable resistor R1. Difference detecting circuit 4 provides a signal representing the difference between the voltages on line P1, and line P2 or between the voltages on line P1 and at point P3. The difference signal is used for driving diaphragm setting means 5.

When changeover switch Sw1 is on contact a, exposure-time-preferred automatic diaphragm control is obtained, and when switch Sw1 is on contact b, programmed automatic exposure control is established. Memory capacitor C1 is used in the programmed automatic exposure control mode. Capacitor C1 stores and retains the voltage at point P3 with the aperture fully opened, due to switch Sw2 being opened immediately before the diaphragm is stopped-down in accordance with the programmed automatic exposure control mode.

The following description concerns exposure-time-preferred automatic diaphragm control. In this case, switches Sw1, Sw' are on their respective contacts a. Assume that the shutter speed is set to 1/125 second by manual exposure setting circuit 3, and that the output of light measuring circuit 1 with the aperture fully opened corresponds to a shutter speed of 1/2000 second. In this case, the difference between the set shutter speed and the measurement of the shutter speed corresponds to four steps in terms of shutter-speed graduation, and therefore the difference between the voltages on both lines P1, P2 corresponds to the above difference of four steps. Accordingly, difference detecting circuit 4 generates a voltage signal to stop-down the diaphragm by four steps from its fully open aperture size. Assume that the fully open aperture size corresponds to F 1.4, then the aperture size will be F 5.6 after the diaphragm is stopped-down by four steps. Thus, an optimum exposure may be achieved according to a combination of a diaphragm aperture of F 5.6 with a shutter speed of 1/125 second. One of the mechanisms used as a diaphragm setting means is the deflection angle of a voltmeter pointer corresponding to the steps to be stopped-down, and is generally used in automatic aperture control. As an alternative, there has been proposed another mechanism, which utilizes the fact that when stopping-down a diaphragm the difference in the voltages on lines P1 and P2 is eventually nullified. A signal is developed, when the difference detecting circuit detects a zero difference, whereby the diaphragm is locked so as not to be stopped-down further. The shutter speed is determined by controlling a shutter control circuit according to the output voltage of manual exposure time setting circuit 3.

The following description pertains to programmed automatic exposure control. In this case, switch Sw' remains on contact a, and switch Sw1 is on contact b.

The shutter speed is set by manual exposure time setting circuit 3 to a suitable shutter speed, for instance, a limit for blurless exposure, of for example 1/30 second. Assume that the light measurement with a fully open aperture, which has been obtained from light measuring circuit 1, corresponds to a shutter speed of 1/2000 second. Then the difference between the voltages on lines P1 and P2 corresponds to six steps in terms of shutter speed graduation. In the case of programmed automatic exposure control mode, the difference between the voltages on lines P1 and P3 is used for determining the aperture size. If the resistances of resistors R1 and R2 are equal, then the diaphragm is stopped-down by three steps from its fully open aperture size, while the remaining three steps are allotted to the shutter speed. Thus, the shutter speed is set to 1/250 second, which is three steps higher than 1/30 second. In this manner, the entire range of an exposure with a fully open aperture and a shutter speed of 1/30 second to an exposure with a minimum-aperture and the shortest exposure time may be covered by the programmed automatic exposure control. A ratio of the resistances of resistor R1 to R2 governs the distribution of the steps between lines P1, P2 to control the aperture size and shutter speed. The shutter speed is controlled by the voltage at contact b of switch Sw1, which is determined by the voltage stored in capacitor C1 and thus becomes 1/250 second which is three steps higher than the initially set shutter speed of 1/30 second. Switch Sw2, which is opened before the stopping-down motion to store the voltage at point P3 by capacitor C1, and capacitor C1 should not necessarily be used in principle, but are required depending on the type of diaphragm setting means 5. Stated more specifically, switch Sw2 and capacitor C1 should not be used in the case of a meter type control, in which the meter pointer is deflected in accordance with the output of difference-detecting circuit 4. However, switch Sw2 and capacitor C1 are required in the case of the type of diaphragm setting means in which the stopping-down operation is interrupted at the time when a zero difference is detected by difference detecting circuit 4, during the stopping-down of the diaphragm. This is because the voltage on line P1 is varied due to the stopping-down operation, and thus the voltage at point P3 is varied accordingly.

The circuit arrangement shown in FIG. 1 may be used intact for diaphragm-preferred automatic exposure time control. In this case, the operation of diaphragm setting means 5 is released, the diaphragm is stopped-down to a preset aperture value which has been manually set, and switch Sw' is switched to contact b to control the shutter speed according to the voltage on line P1.

Figure 2:
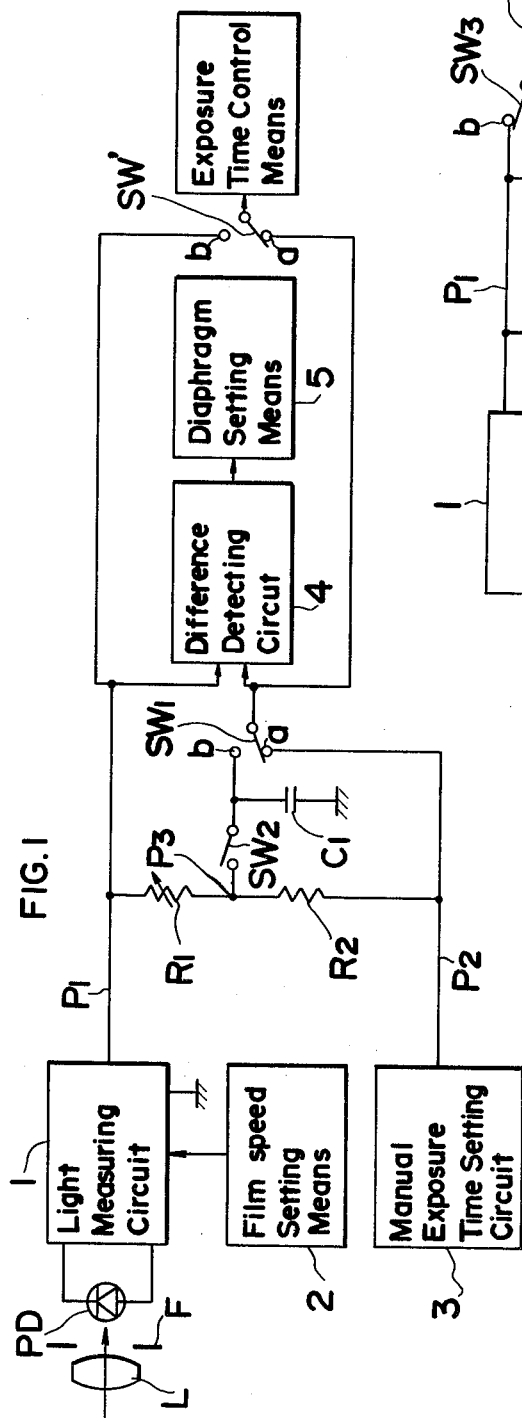
FIG. 2 is a combined block and schematic diagram illustrating a part of FIG. 1 in detail with an indication circuit combined thereto.

FIG. 2 specifically shows the indicating circuit which is omitted in FIG. 1 and which operates in conjunction with light measuring circuit 1, and manual exposure time setting circuit 3. In FIG. 2, like components are designated the same reference numerals as in FIG. 1. Potentiometer VR1 divides the output voltage of light measuring circuit 1, and sliding terminal P6 thereof may be positioned at the top of the resistance of potentiometer VR1 in cooperation with a diaphragm presetting ring (not shown) at a fully opened aperture position, and lowered according to the rotation of the presetting ring from the fully open aperture position. A scale positioned alongside potentiometer VR1 shows the steps which have been stopped-down from a fully opened aperture. In this respect, the difference between voltages on line P1 and sliding terminal P6 is a voltage corresponding to the steps which have been stopped-down, and the voltage on line P1 corresponds to the shutter speed at a fully opened aperture. Thereby, the voltage at sliding terminal P6 corresponds to the shutter speed at a preset aperture. Indicating member 4' is connected in parallel with difference detecting circuit 4, as is apparent from a consideration of FIGS. 1 and 2.

Figure 3:
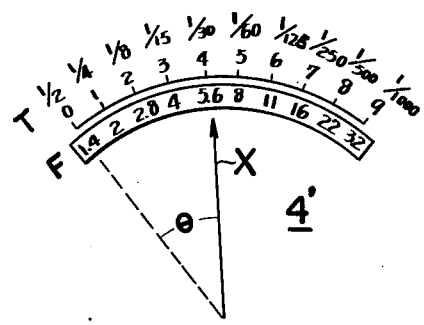
FIG. 3 shows an example of the indication achieved by the circuit of FIG. 2.

FIG. 3 shows the dial plate of meter 4'. Pointer X in meter 4' is positioned to the left extremity of the scale, i.e., at a graduation '0' in the middle scale, when the voltage impressed on input terminals P4' and P5' remains at zero, and pointer X is deflected to the right, when the voltage at input terminal P4' is positive relative to the voltage at input terminal P5'.

The following is a description of the operation for exposure time-preferred-diaphragm automatic exposure control. Switch Sw1 is switched to contact a, and switch Sw3 remains on contact b, and the output of manual exposure time setting circuit 3 remains at a value corresponding to the manually set shutter speed. In this case, the difference between the voltages on lines P1 and P2 corresponds to the number of steps which have been stopped-down from a fully opened aperture, and hence is indicated by meter 4' as a deflection angle θ of pointer X. The middle graduations of meter 4' represent the number of steps which have been stopped-down from a fully opened aperture, and the lower graduations represent corresponding F-numbers. As in the preceding embodiment, in the case where the shutter speed is set to 1/125 second, and the output of light measuring circuit 1 corresponds to 1/2000 second, the difference between the voltages on lines P1 and P2 corresponds to four steps in terms of the number of steps which have been stopped-down. Assume that the fully opened aperture is F 1.4, then pointer X indicates F 5.6.

The following description is with respect to the indication for programmed automatic exposure control. In this case, the shutter speed is set to the lowest shutter speed which has been selected by the photographer suitable, for instance, as the limit for a blurless exposure at 1/30 second, and manual exposure time setting circuit 3 develops a voltage corresponding thereto. Switch Sw1 remains on contact b, and switch Sw3 remains on contact b. Thereby, the voltage to be impressed on meter 4' is the voltage across line P1 and point P3, and corresponds to the number of steps which have been stopped-down from a fully opened aperture. Thus, the number of steps which have been stopped-down and the stopped down F number are indicated on meter 4'.

The following description is with respect to diaphragm-preferred automatic exposure time control. In this case, manual exposure time setting circuit 3 is set to the lowest shutter speed, for example, ½ second, which is indicated by meter 4'. In the case of diaphragm-preferred exposure time control, switch Sw3 is switched to contact a. Switch Sw1 remains on contact a. Thus, the voltage on lines P6 and P2 are impressed on meter 4'. Then, the voltage at terminal P4' of meter 4' is lowered by the number of steps which have been stopped-down if the diaphragm preset ring is set, as compared with the step at the fully opened aperture, so that the meter pointer indicates the shutter speed which is lower by the above number of steps, as compared with the shutter speed at a fully open aperture. Thereby, an optimum shutter speed for the preset aperture is obtained.

Table 1 shows the positions of switches Sw1, SW3 for the manually set shutter speed and preset aperture values for the different exposure modes.

Table 1

| Exposure Mode | Sw1 | Sw3 | Manual Exposure-Time setting | Pre-Set Diaphragm Aperture |
|---|---|---|---|---|
| Exposure Time-Preferred Automatic Diaphragm Control | a | b | Desired Time | Minimum Aperture Size |
| Diaphragm-Preferred Automatic Exposure Time Control | a | a | Longest Time (Ex. 1/2 sec.) | Desired Aperture Size |
| Programmed Automatic Exposure Control | b | b | Limit for Blurless Exposure (Ex. 1/30 sec.) | Minimum Aperture Size |

Figure 4:
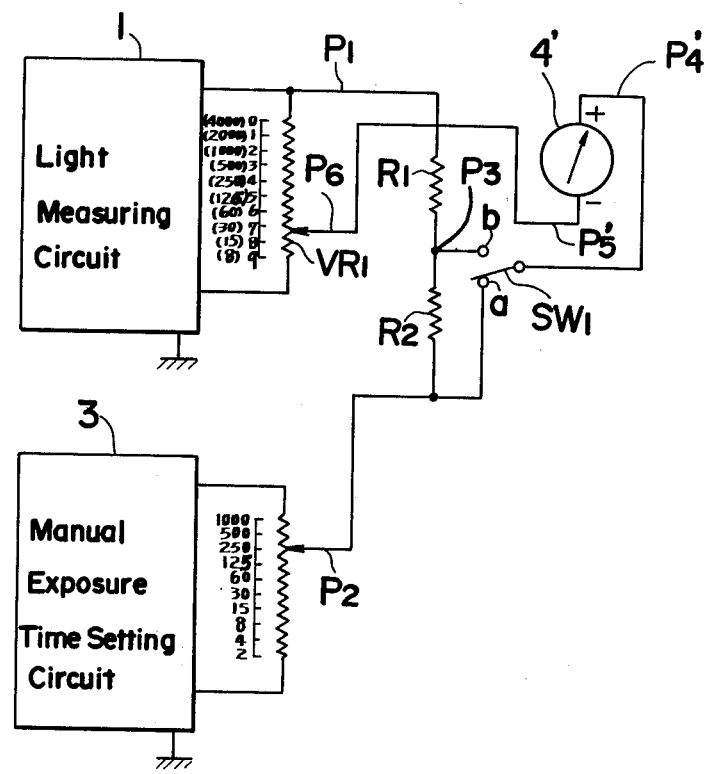
FIG. 4 is a combined block and schematic diagram illustrating a part of another embodiment of the present invention with another indication circuit combined thereto.
Figure 5:
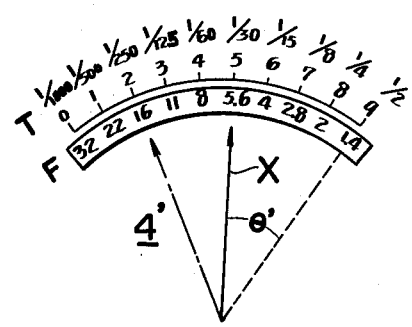
FIG. 5 is an example of the indication achieved by the circuit of FIG. 4.

The following is a description of FIGS. 4 and 5 wherein FIG. 5 shows the dial plate for meter 4' incorporated in the circuit of FIG. 4. When the input to meter 4' remains at zero, pointer X is positioned to the left extremity of the scales, which indicates reduced exposure amounts from the right to the left in contrast to the dial indication shown in FIG. 3. This is because the polarities of the positive and negative terminals for meter 4', which are connected as shown in FIG. 4, are opposite to those in the embodiment of FIG. 2.

With respect to FIG. 4, the following description pertains to the indication for the exposure time-preferred automatic diaphragm control, wherein switch Sw1 is on contact a. Assuming that the output of light measuring circuit 1 corresponds to an object luminance of 1/4000 second in terms of the shutter speed, and that the shutter speed set by manual exposure time setting circuit 3 is 1/250 second, a voltage corresponding to 1/250 second appears on line P2, and is impressed on the positive pole of meter 4'. A preset aperture value in the case of exposure time-preferred automatic diaphragm control is set to the minimum aperture size of the lens used. Under such a condition, the actual aperture size is set to a suitable value between a fully opened aperture size and a minimum aperture size. Slider P6 of potentiometer VR1 is set to a position corresponding to the preset aperture size in accordance with the presetting operation of the diaphragm, while the F-number scale plate in meter 4' is rotated in cooperation therewith, in a manner such that the preset F number on the F number scale is positioned at the left extremity of the scale, when the input to the meter is zero. Assuming that a fully opened F number for the lens is F 1.4, and the F number for the minimum aperture size is F 16, then slider P6 is positioned at graduation 7(30) which is lower by seven steps from the top of potentiometer VR1, while the graduation F16 is indicated by the pointer (as shown by the chain line in FIG. 5) with the input of meter 4' at zero. FIGS. 4 and 5 are views corresponding to the aforesaid respective conditions.

The following description is with respect to the indications of meter 4'. The voltage on line P2 corresponds to a shutter speed of 1/250 second, and the voltage at slider P6 corresponds to 1/30 second which is lower by seven steps from 1/4000 second. Thus, the voltage difference between the voltages on lines P2 and P6 corresponds to three steps in terms of the shutter speed, so that the meter pointer is deflected to the right through an angle of three steps from the chain line, and points at F 5.6. Since a suitable exposure is given by a shutter speed of 1/4000 second at a fully opened aperture, a shutter speed of 1/250 second results in over-exposure of four steps in terms of the shutter speed. Accordingly, the diaphragm is stopped-down by four steps from the fully open aperture, and thus an aperture of F 5.6 is the optimum exposure. As a result, the actual F number coincides with a deflection angle $\theta'$ of the pointer X as measured from the right end of the indicator scale. The reason for this is as follows. Assuming that when a shutter speed is determined so that an optimum exposure may be achieved at F 16, the shutter speed should be 1/30 second, which is three steps slower than 1/250 second. In other words, if a voltage on line P2 corresponds to 1/30 second, and voltage at slider P6 corresponds to 1/30 second, the pointer in meter 4' is deflected through a zero angle. Setting of the shutter speed to 1/250 second signifies the raising of the voltage on line P2 by three steps from 1/30 second, so that the aperture should be opened to an extent corresponding to three steps from F 16. The pointer is designed to be deflected through an angle corresponding to the number of steps to be shifted from a minimum aperture size.

The following description is with respect to the indication for programmed automatic exposure control. In this case, as well, meter 4' indicates the F number. Switch Sw1 is set on contact b and the shutter speed is set to a suitable low value, for instance, to a limit for blurless exposure, for example 1/60 second. In this respect, the output voltage of manual exposure time setting circuit 3, the voltage on line P2, corresponds to 1/60 second, and the voltage output of light-measuring circuit 1, the voltage on line P1, is 1/4000 second as in the preceding embodiment. Therefore, the positive pole input voltage to meter 4' is 1/500 second in terms of the shutter speed, when R1=R2. However, the preset aperture value is set to a minimum aperture size in the case of programmed automatic exposure time control, i.e., to F 16, while slider P6 is positioned at graduation 7 (30) on potentiometer VR1, which graduation corresponds to F16 in terms of an F number, and provides a voltage corresponding to 1/30 second in terms of the shutter speed. The voltage thus provided is impressed on the negative pole of meter 4', so that the meter pointer is deflected through an angle corresponding to a difference in steps between 1/500 second and 1/30 second in terms of the shutter speed, i.e., four steps, from the chain line to the right as viewed in FIG. 5. The chain line includes F 16 as a preset aperture, so that the pointer indicates F 4, which is shifted by four steps therefrom. Accordingly, the diaphragm is stopped-down by three steps from the fully open aperture, F 1.4, so that the F-number becomes F 4. The shutter speed is 1/500 second.

The following description is with respect to the indication for diaphragm-preferred automatic exposure time control, wherein switch Sw1 is on contact a. The shutter speed in manual exposure time setting circuit 3 is set to the maximum speed of a camera, for instance 1/1000 second. Accordingly, the voltage on line P2 remains at a value corresponding to a shutter speed of 1/1000 second. The preset aperture size may be arbitrarily selected. Slider P6 is located in the position corresponding to the aforesaid set aperture size. Also, the scale in meter 4' is rotated such that the maximum shutter speed (1/1000 second in this embodiment) coincides with the pointer position with a zero input to the meter. As an example, when the aperture is pre-set to F 5.6, then the F number thus set is a value which has been stopped-down by four steps from the fully opened F number F 1.4, so that slider P6 is positioned at graduation 4 (250) of potentiometer VR1. Assuming that the output on line P1 is a voltage corresponding to 1/4000 second at the fully opened aperture, then the voltage at slider P6 corresponds to 1/250 second, so that the indication of meter 4' corresponds to a voltage difference between line P2 and slider P6, i.e., a difference of two steps in terms of the shutter speed. Thus, the meter pointer is deflected from 1/1000 second by two steps to the right, thus pointing at 1/250 second, which is the shutter speed for optimum exposure. In fact, the exposure time is 1/4000 second at F 1.4, so that the shutter speed should be slowed down by four steps from 1/4000 second, and hence should remain at 1/250 second.

According to the aforesaid embodiments, the scale of meter 4' is rotated in a manner that the minimum aperture size of the lens used or the graduation of the maximum shutter speed is indexed at a pointer position with a zero input to the meter. Alternatively, a bias voltage corresponding to a rotational angle (number of steps) is impressed on the meter, so that the pointer indicates a minimum aperture size or maximum shutter speed with zero meter input.

Table 2 shows the positions of switch Sw1, the shutter speeds, setting of the aperture and the information indicated by the pointer, for the respective exposure modes.

Table 2

| Exposure Mode | Sw1 | Manual Exposure-Time Setting | Pre-set Diaphragm Aperture | What is indicated |
|---|---|---|---|---|
| Programmed Automatic Exposure Control | b | Limit to Blurless Exposure (Ex. 1/30 sec.) | Minimum Aperture Size | F-number |
| Diaphragm-Preferred Automatic Exposure Time Control | a | Shortest Time (Ex. 1/1000 sec.) | Desired Aperture Size | Exposure Time |
| Exposure Time-Preferred Automatic Diaphragm Control | a | Desired Time | Minimum Aperture Size | F-number |

Figure 6:
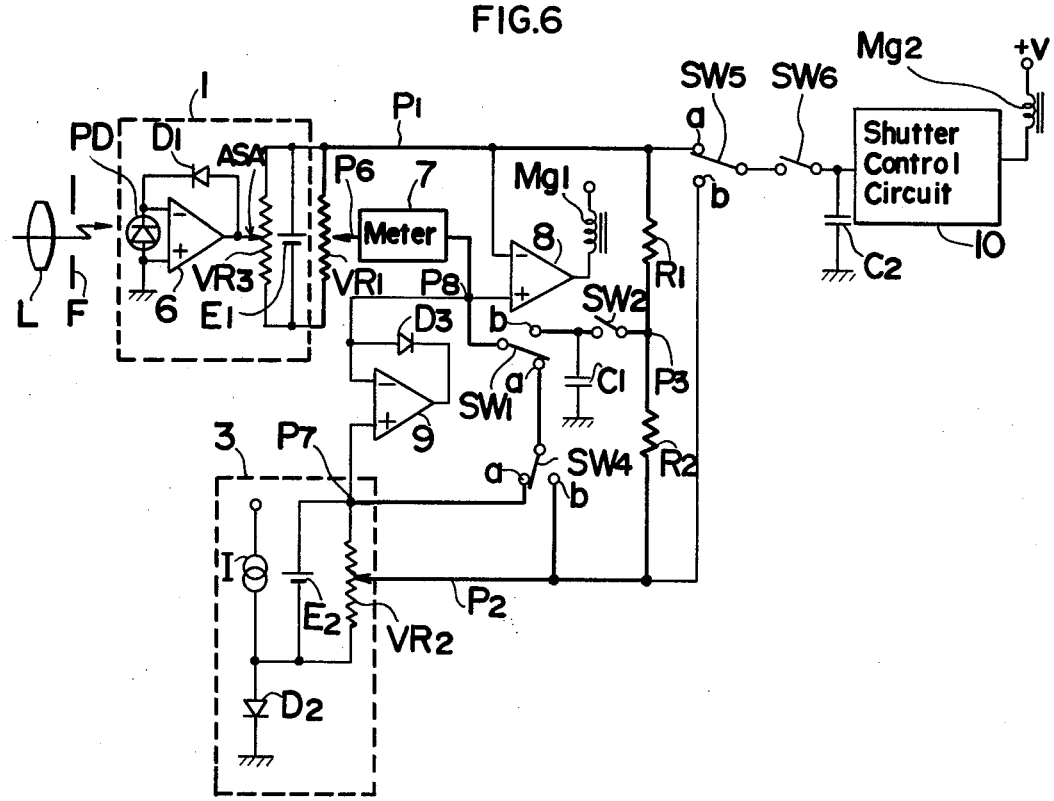
FIG. 6 is a circuit diagram illustrating the embodiment of FIG. 4 in detail.

FIG. 6 shows the complete circuitry for the embodiment shown in FIG. 4, wherein the portions indicated by thick lines represent the arrangement shown in FIG. 4 and meter 7 is the indicating means corresponding to meter 4' of FIG. 4. The difference between FIG. 6 and FIG. 4 is that switch Sw4 is on contact a instead of shifting P2 to the maximum shutter speed position in the diaphragm-preferred automatic exposure time control mode, and that memory switch Sw2 and capacitor C1 store the voltage appearing at node P3. Memory switch Sw2 is opened prior to the stopping-down motion. The other portions of the arrangement of FIG. 6 are described in more detail hereinafter.

The diaphragm setting means includes differential amplifier 8 and magnet Mg1. In both the exposure time-preferred automatic diaphragm control and the programmed automatic exposure control modes, the voltages on line P1 and at node P8 are impressed on differential amplifier 8, and when both voltages are coincident with each other, then the excited condition of magnet Mg1 is changed, so that the diaphragm, which has been stopped-down from its fully opened condition, is locked instantaneously. A limiter circuit consists of operational amplifier 9 and diode D3, which circuit positively equalizes the voltage at node P8 with the voltage at point P7, when the voltage at point P3 (appearing at point P8 via switches Sw2, Sw1) becomes higher than the voltage at P7 (the shutter speed is initially set to a maximum shutter speed, in the programmed automatic exposure control mode). In other words, only the diaphragm is controlled by fixing the shutter speed to an actually possible maximum speed, in the case where the voltage at point P8 becomes higher than a value corresponding to a possible maximum shutter speed. Capacitor C2 is used as a TTL memory capacitor for shutter control. TTL memory switch Sw6, shutter control circuit 10, and magnet Mg2, adapted to control the closure timing of a shutter are also shown. TTL memory switch Sw6 is opened after stopping-down motion has been completed. Automatic-manual changeover switch Sw5, which is switched to contact a in either programmed automatic exposure control, exposure time-preferred automatic diaphragm control, or diaphragm-preferred automatic exposure time control. Switch Sw5 is switched to contact b, for manual exposure control. A logarithmic value of object luminance measured through the diaphragm F is derived from operational amplifier 6 and diode D1, and the film speed of sensitivity information is added thereto by the combination of potentiometer VR3 and voltage source E1. Thus, the sum of the logarithmic value of TTL light measuring output and the film speed information appears on line P1. Diode D2 is used for temperature compensation and a constant current I flows therethrough. Voltage E2 is divided by potentiometer VR2 and the divided voltage is added to the voltage across diode D2, and then that sum is an output for line P2. In a practical application, the voltages shown at E1, E2 are not batteries, but constant voltage source circuits consisting of a constant current source circuit, an operational amplifier and a resistor.

Table 3 shows the relationship between the different exposure modes, positions of the respective switches in the circuit of FIG. 6, the preset F numbers and contents of the exposure indications.

Table 3

| Exposure Mode | Sw1 | Sw4 | Pre-Set Diaphragm Aperture | What is Indicated | Sw5 |
|---|---|---|---|---|---|
| Programmed Automatic Exposure Control | b | a or b | Minimum Aperture Size | F-number | a |
| Diaphragm-Preferred Automatic Exposure Time Control | a | a | Desired Aperture Size | Exposure Time | a |
| Exposure Time-Preferred Automatic Diaphragm Control | a | b | Minimum Aperture Size | F-number | a |
| Manual Exposure | a | a | Desired Aperture | Exposure Time | b |

Table 3-continued

| Exposure Mode | Sw1 | Sw4 | Pre-Set Diaphragm Aperture Size | What is Indicated | Sw5 |
|---|---|---|---|---|---|
| Control | | | | | |

Figure 7:
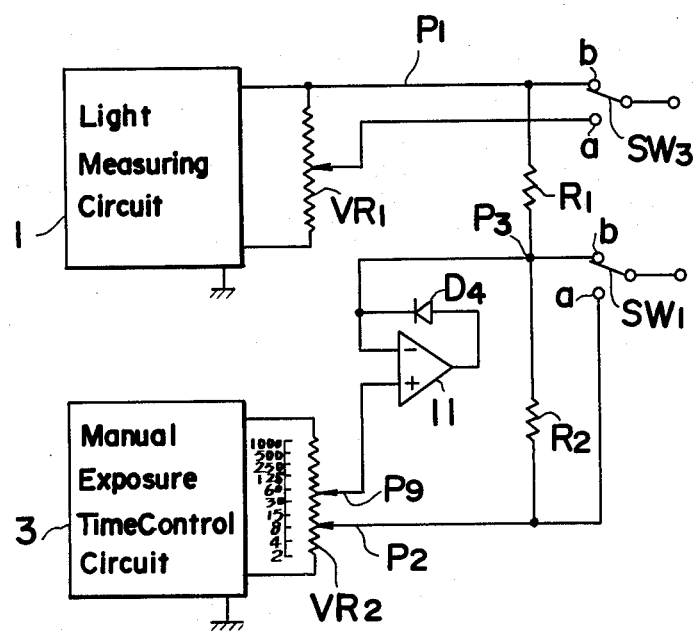
FIG. 7 is a combined block and schematic diagram illustrating a part of a third embodiment of the present invention.
Figure 8:
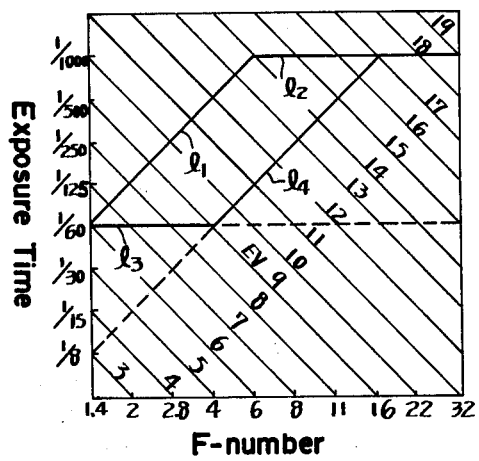
FIG. 8 shows a programmed exposure achieved by the embodiment of FIG. 7.

FIG. 7 shows circuitry providing programmed automatic exposure control in a camera having a lens with a large fully opened aperture. Certain programs for programmed automatic exposure control are shown by lines $l_1$, $l_2$ in FIG. 8. FIG. 8 refers to the case where the lowest shutter speed is set to 1/60 second, in which both the shutter speed and the aperture are varied over a range of exposure values of Ev 6 to Ev 14, and the shutter speed peaks at 1/1000 second at Ev 14, after which only the diaphragm is stopped-down, with an increase in Ev. In this program, there is a tendency that relatively higher shutter speeds and relatively large apertures are used. Accordingly, the lens is used in the condition of relatively smaller depth of focus, which frequently results in an out-of-focus condition. The circuitry shown in FIG. 7 improves this shortcoming, presenting a program represented by lines $l_3$, $l_4$, $l_2$ as shown in FIG. 8. As is clear from lines $l_3$, $l_4$, the aperture in the range from Ev 6 to Ev 17 is smaller in terms of the same Ev value, as compared with a program represented by lines $l_1$, $l_2$ in the preceding embodiment. The difference between the circuit in FIG. 7 and that in FIG. 6 is that sliding terminal P9 is added to potentiometer VR2 and is connected to a non-inverting terminal of operation amplifier 11. Point P3 is connected to the inverting terminal of operation amplifier 11, so that negative feedback is applied through diode D4. Amplifier 11 and diode D4 constitute a limiter. However, the polarity of this limiter is opposite to that of the limiter (amplifier 9, diode D3) of FIG. 6, so that if the voltage of point P3 is lower than the voltage at slider P9, the voltage of point P3 is raised to the level of slider P9. In this respect, slider P9 is set to the limit for a blurless exposure, while slider P2 is set to a position for a lower speed. The limit for a blurless exposure is assumed to be 1/60 second. When a picture is taken at a shutter speed of 1/60 second, over a range of apertures from F numbers F 1.4 to F 4, then slider P2 is set to a position of 1/8 second which is lower than 1/60 second by three steps which corresponds to the steps between F 4 and F 1.4. The voltage at point P3 tends to be lower than the voltage at slider P9 when Ev remains below "9", so that the voltage at point P3 is raised to the level of the voltage at slider P9 so as to maintain a given value corresponding to the shutter speed of 1/60 second. As a result, the program follows the line $l_3$. At Ev's in excess of "9", the potential at point P3 becomes higher than that at slider P9, so that the limiter function of amplifier 11 is lost. Thus, the program follows line $l_4$. The lines $l_3$, $l_4$ may be set arbitrarily according to the position of sliders P2 and P9.

According to the present invention, there may be obtained three type signals, i.e., an optimum shutter speed signal (voltage) according to a TTL light measuring system, a signal (voltage) corresponding to a shutter speed which has been selected arbitrarily, and an intermediate level signal relative to the above two signals, which signal is obtained by proportioning the difference between the above two signals. The exposure time-preferred automatic diaphragm control may be achieved by stopping-down the diaphragm according to the difference in voltage between the optimum shutter speed signal and the selected shutter speed signal. Additionally, programmed automatic exposure control may be achieved by stopping-down the diaphragm according to the difference between the optimum shutter speed signal and the intermediate level signal, and by controlling the exposure time according to the intermediate level signal or an equivalent thereof. Moreover, diaphragm-preferred automatic exposure time control may be achieved by using the optimum shutter speed signal obtained with the diaphragm having been stopped-down to a preset aperture value. In other words, the control of three exposure modes may be effected according to the changeover of a single circuit, thereby resulting in simplification of the circuit arrangement. Also, the indicating means in the aforesaid embodiments is not necessarily limited to a meter type, but a digital indicating type may be used.

Further, if the resistance of resistor R1 is FIG. 1 is designed to be manually variable, then the photographer may vary the ratio of R1 to R2 at his discretion. In that case, the gradients of lines $l_1$, $l_2$ as shown in FIG. 8 may be set as desired by the photographer.

What is claimed is:

1. A photographic camera capable of programmed automatic exposure control comprising:
    a diaphragm settable to an initial aperture size and capable of being changed to various aperture sizes;
    first means for generating a first signal in accordance with the logarithm of light intensity measured through the diaphragm;
    second means for generating a second signal in accordance with a given value;
    third means responsive to said first and second signals for generating a third signal intermediate said first and second signals with the ratio of the difference between the first and third signals to the difference between the third and second signals being predetermined;
    means for setting the diaphragm aperture by determining the difference from the initial aperture size to an aperture size to be set in accordance with one of the differences between the first and third signals and the difference between the first and second signals with the diaphragm at the initial aperture size; and
    means for controlling the exposure time commensurate with the diaphragm aperture set by the diaphragm aperture setting means.

2. A photographic camera as in claim 1, wherein the exposure time controlling means includes means for determining the exposure time in accordance with the second signal added to the other of the difference between the first and third signals and the difference between the third and second signals with the diaphragm at the initial aperture size.

3. A photographic camera as in claim 1, wherein the exposure time controlling means includes means for determining the exposure time in accordance with the first signal with the diaphragm having been set by the diaphragm aperture setting means.

4. A photographic camera as in claim 1, wherein the diaphragm aperture setting means includes means for holding the third signal with the diaphragm at the initial aperture size, means for comparing the first signal with the held third signal during the change in the diaphragm aperture size from the initial aperture size, and means for stopping the change of the diaphragm aperture size with the first signal in a predetermined relation with the held third signal.

5. A photographic camera as in claim 1, wherein the initial aperture size of the diaphragm is the fully open size and the diaphragm is capable of being stopped-down to various aperture sizes by said means for setting the diaphragm aperture.

6. A photographic camera as in claim 1, wherein the first means further includes means for adding a film speed signal to the logarithm of light intensity measured through the diaphragm to form said first signal, and wherein the second means generates the second signal as a signal indicative of a given exposure time.

7. A photographic camera as in claim 6, wherein the second means comprises means for manually setting the value of the second signal indicative of an exposure time.

8. A photographic camera as in claim 6, wherein the diaphragm setting means determines the difference from the initial aperture size to an aperture size to be set in accordance with the difference between the first and third signals with the diaphragm at the initial aperture size.

9. A photographic camera as in claim 8, further comprising means for shifting the value of the third signal to a value indicative of the minimum exposure time attainable by the camera when the third signal is indicative of an exposure time shorter than the minimum exposure time.

10. A photographic camera as in claim 8, further comprising means for shifting the value of the third signal to a value indicative of a predetermined exposure time when the third signal is a value indicative of an exposure time longer than the predetermined exposure time.

11. A photographic camera as in claim 8, wherein the exposure time controlling means includes means for determining the exposure time in accordance with either the second signal or the third signal with the diaphragm at its initial aperture size, and wherein the diaphragm setting means determines the difference between the initial aperture size and the aperture size to be set in accordance with either the difference between the first and second signals or the difference between the first and third signals with the diaphragm at its initial aperture size.

12. A photographic camera as in claim 8, wherein the exposure time controlling means includes means for determining the exposure time in accordance with either the second signal or the first signal with the diaphragm having been set by the diaphragm setting means, and wherein the diaphragm setting means determines the difference between the initial aperture size and an aperture size to be set, in accordance with either the difference between the first and second signals or the difference between the first and third signals with the diaphragm at its initial aperture size.

13. A photographic camera as in claim 8, further comprising fourth means to generate a fourth signal in accordance with a manually pre-set aperture size wherein the difference between the fourth and first signals is determined in accordance with the difference between the initial aperture size and the manually pre-set aperture size; and means for indicating exposure information and including a first terminal for selectively receiving either the first or fourth signals and a second terminal for selectively receiving either the third or second signal.

14. A photographic camera as in claim 8, further comprising fourth means to generate a fourth signal in accordance with a manually pre-set aperture size wherein the difference between the fourth and first signals is determined in accordance with the difference between the initial aperture size and the manually pre-set aperture size; and means for indicating exposure information including a first terminal for receiving the fourth signal and a second terminal for selectively receiving either the third or second signal.

15. A photographic camera as in claim 1, wherein the third means comprises means for variably setting the predetermined ratio.

16. A photographic camera as in claim 1, wherein the first means includes an output terminal at which the first signal is produced as a voltage level signal, the second means includes an output terminal at which the second signal is produced as a voltage level signal, and the third means includes a voltage divider connected between the output terminals of the first and second means to thereby produce the third signal at the dividing point of the voltage divider.

17. A photographic camera as in claim 1, wherein said first means further includes means for generating a film speed signal and combined with said logarithm of light intensity measured through the diaphragm to form said first signal, and wherein said second means includes means for manually setting the value of said second signal to be indicative of exposure time, said first signal is equal to said second signal when the optimum exposure condition is achieved for the measured light intensity by the combination of the F-number of the initial aperture size and the exposure time indicated by said second signal.

18. A photographic camera as in claim 17 wherein the exposure time controlling means includes means for determining the exposure time in accordance with the second signal added to the other of the difference between the first and third signals and the difference between the third and second signals with the diaphragm at the initial aperture size.

19. A photographic camera as in claim 17 wherein the exposure time controlling means includes means for determining the exposure time in accordance with the first signal with the diaphragm having been set by the diaphragm aperture setting means.

20. A photographic camera as in claim 18 wherein the diaphragm aperture setting means includes means for holding the third signal with the diaphragm at the initial aperture size, means for comparing the first signal with the held third signal during the change in the diaphragm aperture size from the initial aperture size, and means for stopping the change of the diaphragm aperture size with the first signal in a predetermined relation with the held third signal.

21. A photographic camera as in claim 19 wherein the diaphragm aperture setting means includes means for holding the third signal with the diaphragm at the initial aperture size, means for comparing the first signal with the held third signal during the change in the diaphragm aperture size from the initial aperture size, and means for stopping the change of the diaphragm aperture size with the first signal in a predetermined relation with the held third signal.

* * * * *